United States Patent [19]

Fuller

[11] Patent Number: 5,165,712
[45] Date of Patent: Nov. 24, 1992

[54] FLOATING FENDER MOUNT AND METHOD

[76] Inventor: Wyatt S. Fuller, 6289 N.W. 62nd Terrace, Parkland, Fla. 33067

[21] Appl. No.: 675,859

[22] Filed: Mar. 27, 1991

[51] Int. Cl.⁵ .............................................. B62K 25/08
[52] U.S. Cl. .................................. 280/277; 280/152.1; 280/152.3; 280/157; 280/276; 293/105
[58] Field of Search ............... 280/152.3, 156, 158.1, 280/279, 275, 276, 277, 152.1, 157, 160.1, 852; 180/219; 293/105, 103, 104, 140, 141

[56] References Cited

U.S. PATENT DOCUMENTS

| | | |
|---|---|---|
| 4,278,266 | 7/1981 | Inoue et al. ......................... 180/219 |
| 4,366,880 | 1/1983 | Miller et al. ........................ 180/219 |
| 4,458,909 | 7/1984 | Morioka .............................. 280/279 |
| 4,620,713 | 11/1986 | Sakaguchi ......................... 280/152.3 |
| 4,770,460 | 9/1988 | Miura et al. ......................... 296/78.1 |
| 5,026,083 | 6/1991 | Wendorf .............................. 293/105 |

FOREIGN PATENT DOCUMENTS

| | | |
|---|---|---|
| 424524 | 8/1947 | Italy ...................................... 280/275 |
| 208187 | 8/1990 | Japan .................................... 180/219 |
| 148322 | 10/1931 | Switzerland ......................... 280/275 |

OTHER PUBLICATIONS

Front Cover Harley Davidson Calender, 1989 showing photograph of "Springer Softail" motorcycle.
Photograph of Harley Davidson motorcycle showing typical raised front fender.

*Primary Examiner*—Eric D. Culbreth
*Attorney, Agent, or Firm*—Oltman and Flynn

[57] ABSTRACT

An assembly for mounting a fender on a vehicle having a body and at least one axle fitted with at least one resiliently suspended wheel, includes a linkage member on at least one side of the at least one wheel extending from its axle to the fender, for securing the fender relative to the wheel, a fastener for rotatably securing the linkage member to the axle, at least one mounting member for securing the linkage member to the fender, the at least one mounting member having a slot extending parallel to the axis of the linkage member which slidably receives at least one projecting member extending from the body, for permitting the mounting member and fender to move relative to the body along the path of the slot. The at least one mounting member preferably includes a slot member which includes the slot, attached perpendicularly to a fastening member for fastening the at least one mounting member to the fender. A method is also provided for mounting a fender on a vehicle having a body and at least one axle fitted with at least one wheel, including the steps of joining the fender to the at least one axle with a linkage member so that the fender and axle cannot move relative to each other, and preventing the fender from rotating around the axle with a member projecting from the body into a slot in a slot member extending parallel to the axis of the linkage member.

9 Claims, 4 Drawing Sheets

FLOATING FENDER MOUNT AND METHOD

BACKGROUND OF THE INVENTION

1. Field of the Invention

The present invention relates generally to the field of vehicle fender mounts, and more specifically to a fender mount for use with wheels having spring suspension, which causes the fender to float and retract with the wheel, permitting the fender to be positioned close to the wheel.

2. Description of the Prior Art

There have long been mounting assemblies for securing fenders to vehicles. Where the vehicle is a motorcycle, these devices typically attach the fender to the front fork. On vehicles having compressed spring suspension, the fender is mounted high above the tire to leave room for wheel retraction. A problem with this arrangement is that the fender's shielding ability is reduced. The farther away from the tire a fender is located, the more easily sand, mud and stones can fly past it. Another problem is that the aesthetic appeal and artistic form designed into a vehicle can be significantly diminished by an apparently out of place fender. These problems can be found on motorcycles and off-road recreational vehicles such as beach buggies.

It is thus an object of the present invention to provide an apparatus and method for mounting a vehicle fender over a spring-suspended wheel which permits the fender to be mounted close to the wheel without being struck by the wheel.

It is another object of the present invention to provide such an apparatus which is simple in construction and thus reliable and easy to install and service.

It is still another object of the present invention to provide such an apparatus which is inexpensive.

It is finally an object of the present invention to provide such an apparatus which minimally alters the appearance of the vehicle apart from lowering the fender.

SUMMARY OF THE INVENTION

The present invention accomplishes the above-stated objectives, as well as others, as may be determined by a fair reading and interpretation of the entire specification.

An assembly is provided for mounting a fender on a vehicle having a body and at least one axle fitted with at least one resiliently suspended wheel, which includes a linkage member on at least one side of the at least one wheel extending from its axle to the fender, for securing the fender relative to the wheel, a fastener for rotatably securing the linkage member to the axle, at least one mounting member for securing the linkage member to the fender, the at least one mounting member having a slot extending parallel to the axis of the linkage member which slidably receives at least one projecting member extending from the body, for permitting the mounting member and fender to move relative to the body along the path of the slot. The vehicle may be a motorcycle and the body may include a fixed fork and a spring fork, and the at least one projecting member extends from the spring fork. The at least one mounting member preferably includes a slot member which includes the slot, attached perpendicularly to a fastening member for fastening the at least one mounting member to the fender. The slot member preferably has a lip which projects perpendicularly from its edge to the fastening member to separate the slot from the fastening member.

The at least one projecting member may be a bolt, fitted with a nut which rides within the slot. The linkage member preferably includes at least one metal rod extending from the axle to the mounting member. The linkage member may additionally include a plate joined to an end of the at least one metal rod, having a mounting port for securing the linkage member to the axle. An end of the linkage member may be bent at an essentially right angle to meet the at least one mounting member. A method is also provided for mounting a fender on a vehicle having a body and at least one axle fitted with at least one wheel, including the steps of joining the fender to the at least one axle with a linkage member so that the fender and axle cannot move relative to each other, and preventing the fender from rotating around the axle with a member projecting from the body into a slot in a slot member extending parallel to the axis of the linkage member.

BRIEF DESCRIPTION OF THE DRAWINGS

Various other objects, advantages, and features of the invention will become apparent to those skilled in the art from the following discussion taken in conjunction with the following drawings, in which:

4. FIG. 4 is a broken, perspective view of the wheel side of the inventive fender mount.

5. FIG. 5 is a broken, perspective view of the outer side of the inventive fender mount.

DETAILED DESCRIPTION OF THE PREFERRED EMBODIMENTS

Figure 1:
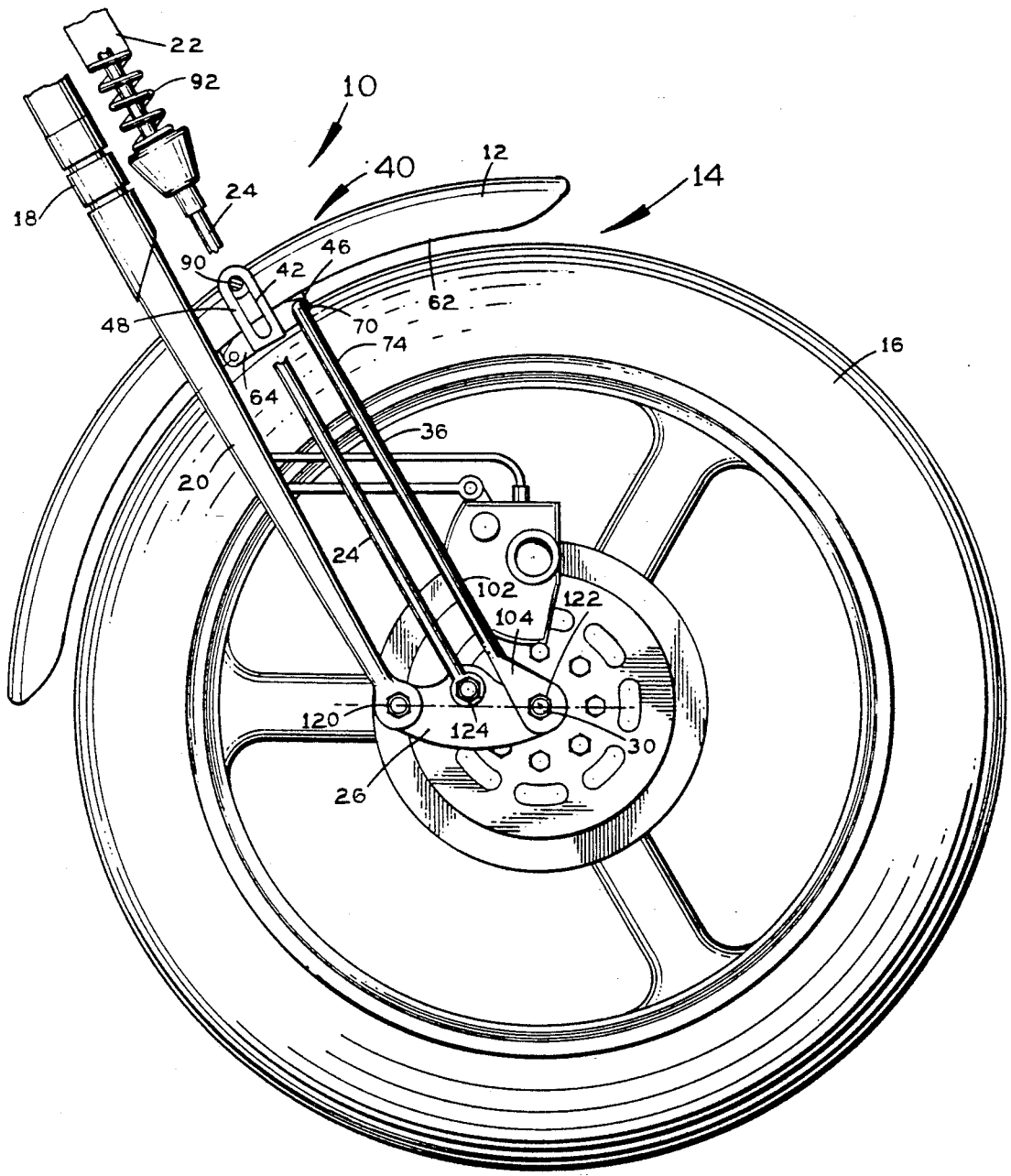
FIG. 1 is a side view of a front motorcycle wheel fitted with the preferred embodiment of the inventive fender mount. The wheel is shown at full extension.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

PREFERRED EMBODIMENTS

Referring to FIG. 1, a floating mount 10 is disclosed for the front fender 12 of a motorcycle 14 having a front wheel 16 attached to a fixed fork 18 with two prongs 20 and a spring fork 22 with two prongs 24. On either side of wheel 16, prongs 20 and 24 are attached to a pivot plate 26 which is rotatably attached to the front axle 30.

Figure 2:
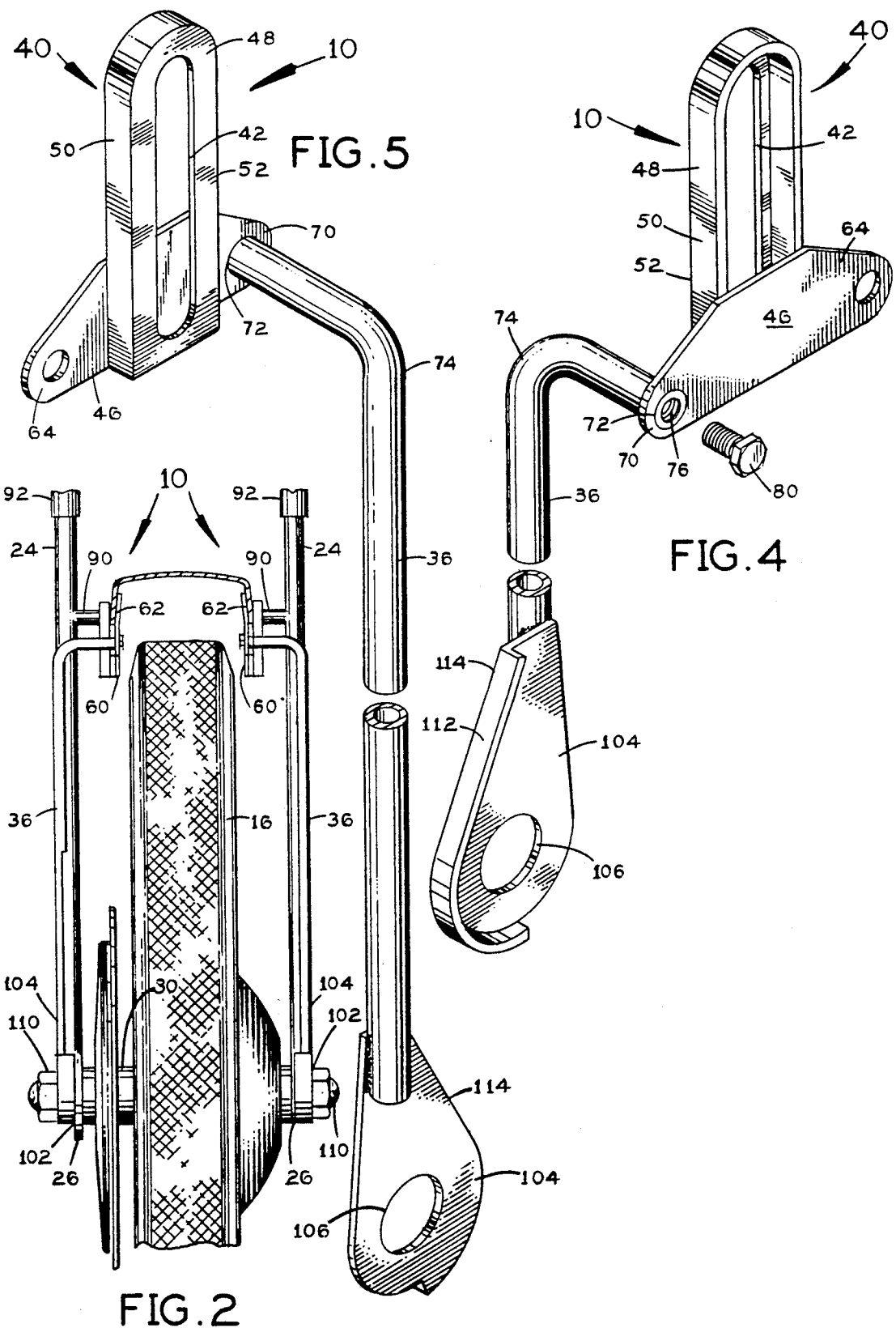
FIG. 2 is an edge view of a front motorcycle wheel fitted with the inventive fender mount.

A floating mount 10 is provided on either side of wheel 16 to join wheel 16 to fender 12. See FIG. 2. Each floating mount 10 causes fender 12 to move linearly with wheel 16 during retractions of spring fork 22. This permits fender 12 to be mounted very close to wheel 16 without being struck during retraction.

Figures 3, 6:
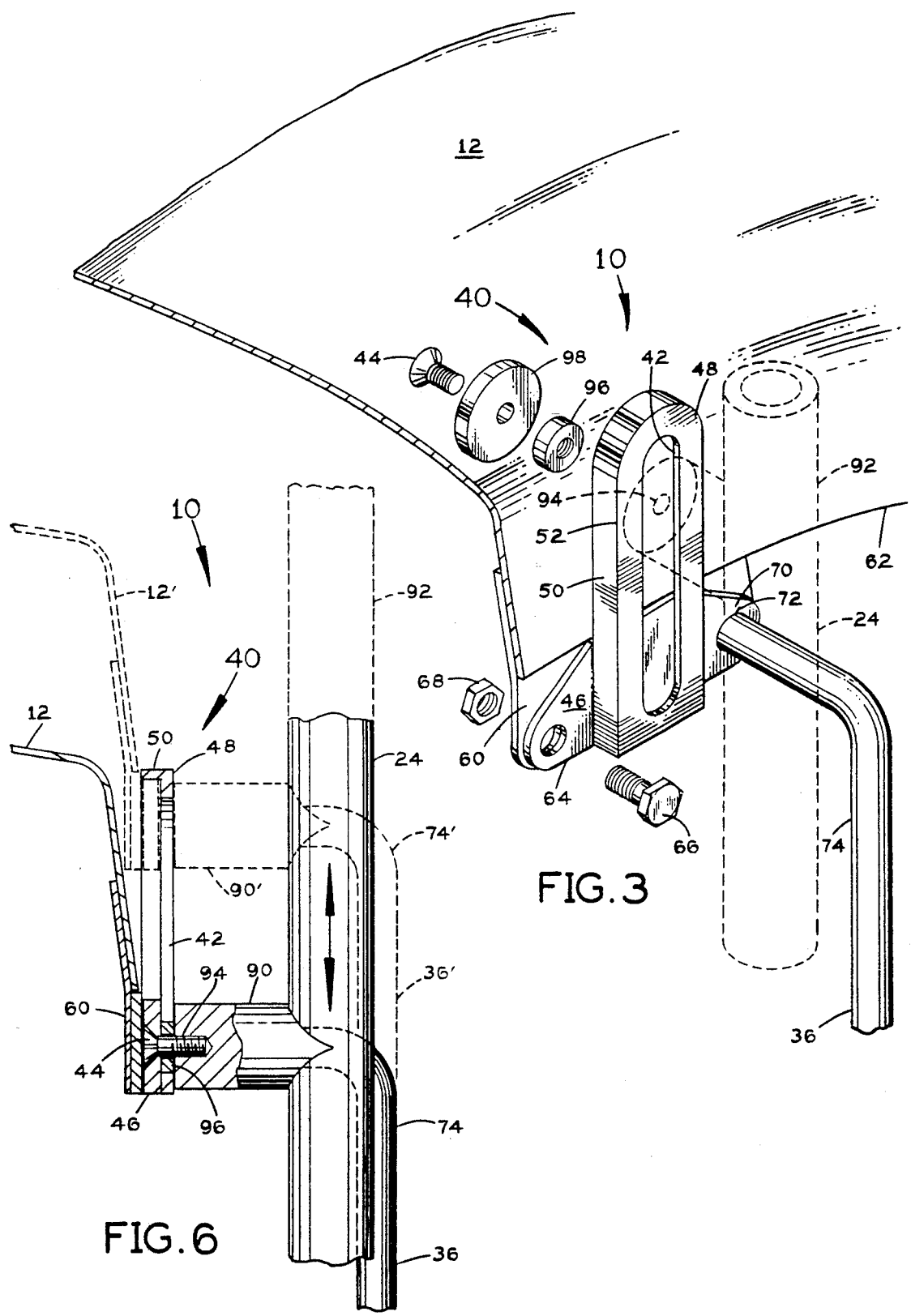
FIG. 3 is an exploded, perspective close-up of a fender and the guide assembly. The spring fork prong is shown in broken lines.
FIG. 6 is a close-up, edge view of the fender and guide assembly, showing the extended position of the fender in solid lines and the retracted position in broken lines. Members shown in the retracted position are identified with a prime notation.

Floating mount 10 includes a guide assembly 40 attached to fender 12 and connected to axle 30 by a linkage 36. See FIG. 3. It is linkage 36 which causes fender 12 to move with axle 30 and wheel 16 during retraction, while guide assembly 40 retains fender 12 against rotation. Guide assembly 40 includes a slot 42 which receives a bolt 44 extending from prong 24 and permits linkage 36 to move parallel with prong 24 during spring fork 22 retraction.

Guide assembly 40 preferably includes a fastening member 46 and a slot member 48 containing slot 42. Fastening member 46 and slot member 48 are secured together to form an inverted T-shape, with slot member 48 forming the stem of the T. See FIGS. 4 and 5. Slot member 48 has a lip 50 extending perpendicularly from its outer edge 52 to fastening member 46, separating slot 42 from fastening member 46.

An anchoring tab 60 is welded to an edge 62 of each side of fender 12. See FIG. 3. One end 64 of fastening member 46 is fastened to tab 60 with a bolt 66 and nut 68. The other end 70 of fastening member 46 has a linkage receiving hole 72. The fender end 74 of linkage 36 is bent at a right angle to fit into hole 72. A threaded axial bore 76 is provided in fender end 74 of linkage 36 and a bolt 80 is screwed into bore 76 to secure linkage 36 to fastening member 46.

A tracking member 90 extends from motorcycle body 92, and preferably from spring fork prong 24, to slot 42. See FIG. 3. Tracking member 90 has an axial bore 94 threaded to receive bolt 44, mentioned above. A guide nut 96, with a diameter equal to or slightly less than the width of slot 42, fits around bolt 44 and into slot 42. A washer 98 is provided around bolt 44 between nut 96 and the head of bolt 44. As body 92 moves relative to fender 12, nut 96 rides within slot 42. See FIGS. 3 and 6.

Axle end 102 of linkage 36 is flattened to form a securing plate 104 having an axle port 106 to receive a bolt 110 securing plate 104 to axle 30. See FIG. 4. Plate 104 has a lip 112 extending perpendicularly along a portion of its edge 114 to fit around pivot plate 26 for added stability.

Figure 7:
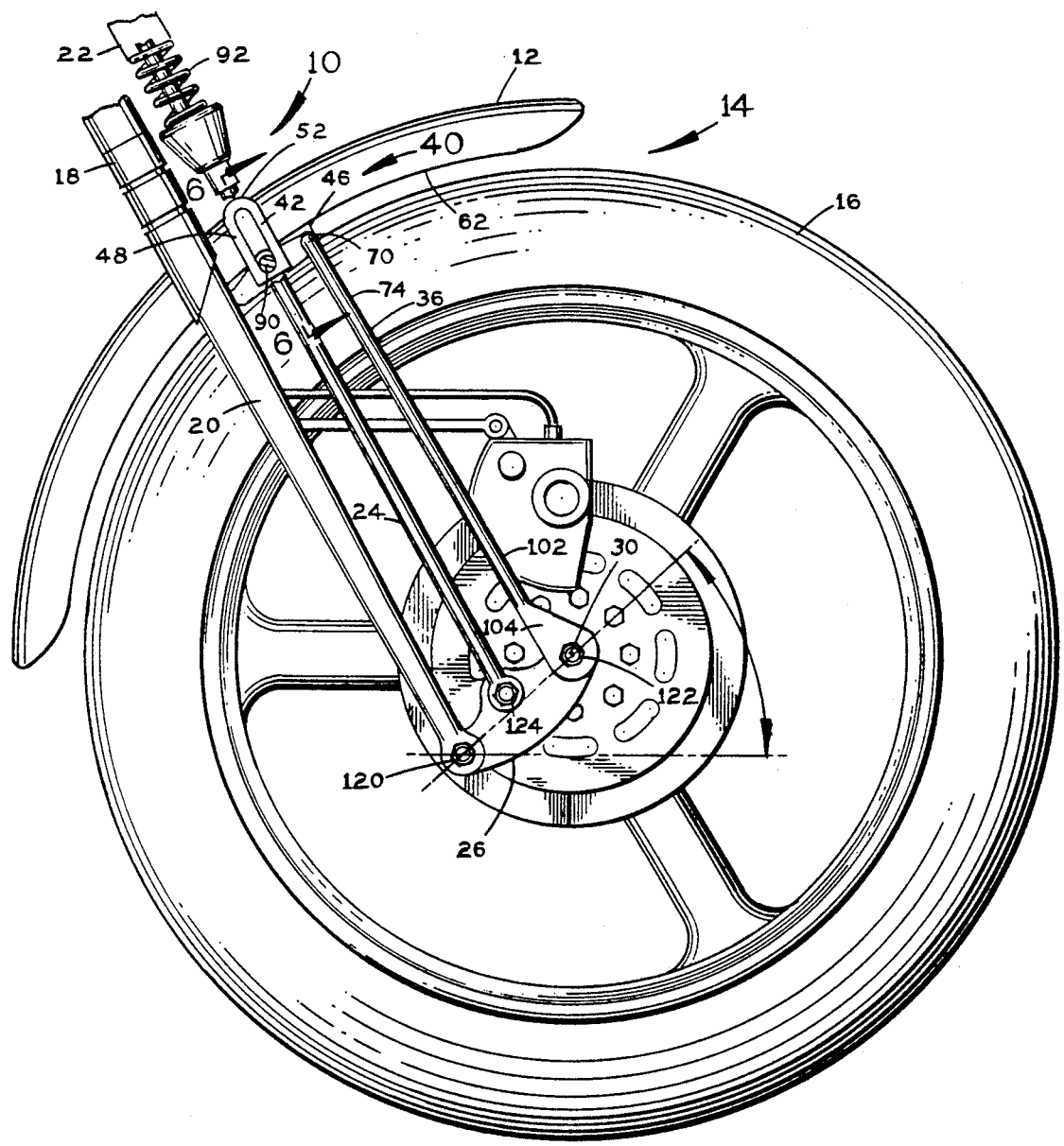
FIG. 7 is a side view of a front motorcycle wheel fitted with the preferred embodiment of the inventive fender mount. The wheel is shown at full retraction.

Each fixed fork prong 20 pivotally attaches to one end of pivot plate 26 at connection point 120 and linkage 3 pivotally attaches to the other end of plate 26 at connection point 122. Spring fork prong 24 pivotally attaches to pivot plate 26 between prong 20 and linkage 36, at connection point 124. Thus when wheel 16 encounters a bump, it pivots on plate 26 around connection point 120. See FIG. 7. Since the radial distance from connection point 120 to connection points 122 and 124 are different, spring fork prong 24 and linkage 36 move axially with respect to each other during retraction. Slot 42 permits this axial movement while preventing fender 12 from rotating around axle 30.

METHOD

In practicing the invention, the following method may be used. Fender 12 is joined to axle 30 with linkage means 36 so that they cannot move relative to each other. Fender 12 is prevented from rotating about axle 30 with slot means 48 extending parallel to the axis of linkage means 36, for receiving a member 90 projecting from body 92.

Although the preferred embodiment of the inventive fender mount is adapted to fit a motorcycle, it can find application on other vehicles as well. These include beach buggies and other off-road vehicles, and virtually any vehicle where spring suspension prevents close mounting of the fenders.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An assembly for mounting a fender on a motorcycle having a body, and an axle having a longitudinal axis fitted with at least one resiliently suspended wheel, said body having a fixed fork and a spring fork, comprising:

a pivoting arm member for connecting a tine of the fixed fork to the axle, the pivoting arm member having an outer face opposite the wheel, and the outer face having an edge adjacent to and extending around the axle, the edge defining a plane, and the plane intersecting the longitudinal axis of the axle at a first point, at least one linkage mounting member, linkage means having a longitudinal axis and extending directly from the axle of the at least one wheel to a point adjacent said fender and on said at least one linkage mounting member which, if taken together with said first point, dfines a line essentially parallel to the longitudinal axis of the tines of the fixed fork, for securing the fender at a constant distance from the at least one wheel, fastening means for rotatably securing the linkage means to the axle, the at least one linkage mounting member having slot means extending parallel to the longitudinal axis of the linkage means which slidably receives at least one projecting member extending from the spring fork, for permitting the mounting member and fender to move relative to the body along the path of the slot means.

2. An assembly for mounting a fender on a vehicle having a body, and at least one axle fitted with at least one resiliently suspended wheel, said body having at least one downward extending, fixed leg member, said fixed leg member having a longitudinal axis, comprising:

a pivoting arm member for connecting the fixed leg member to the at least one axle, the pivoting arm member having an outer face opposite the wheel, and the outer face having an edge adjacent to and extending around the axle, the edge defining a plane, and the plane intersecting the longitudinal axis of the axle at a first point, at least one linkage mounting member, linkage means on at least one side of the at least one wheel having a longitudinal axis and extending directly from the at least one axle of the at least one wheel to a point on said at least one linkage mounting member which, if taken together said first point, defines a line essentially parallel to the longitudinal axis of the fixed leg member, for securing the fender at a constant distance from the at least one wheel, fastening means for rotatably securing the linkage means to the at least one axle, the at least one linkage mounting member having slot means extending parallel to the longitudinal axis of the linkage means which slidably receives at least one projecting member extending from the body, for permitting the mounting member and fender to move relative to the body along the path of the slot means, wherein a slot member comprises the slot means and is attached perpendicularly to a fastening member for fastening the at least one mounting member to the fender, and the bolt is fitted with a nut which rides within the slot means.

3. An assembly for mounting a fender on a vehicle having a body, and at least one axle fitted with at least one resiliently suspended wheel, comprising:

linkage means on at least one side of the at least one wheel having a longitudinal axis and extending from the at least one axle of the at least one wheel to the fender for securing the fender at a constant distance from the wheel, fastening means for rotatably securing the linkage means to the at least one axle, at least one mounting member for securing the linkage means to the fender, the at least one mounting member having slot means extending parallel to the longitudinal axis of the linkage means which slidably receives at least one projecting member in the form of a bolt extending from the body, for permitting the mounting member and fender to move relative to the body along the path of the slot means, wherein a slot member comprises the slot means and is attached perpendicularly to a fastening member for fastening the at least one mounting member to the fender, and the bolt is fitted with a nut which rides within the slot means.

4. An assembly as in claim 3, wherein the at least one mounting member comprises:

a slot member which comprises the slot means, attached perpendicularly to a fastening member for fastening the at least one mounting member to the fender.

5. An assembly as in claim 4, wherein the slot member has a lip which projects perpendicularly from its edge to the fastening member to separate the slot means from the fastening member.

6. An assembly as in claim 4, wherein the at least one projecting member is a bolt.

7. An assembly as in claim 3, wherein the linkage means comprises at least one metal rod extending from the axle of the at least one wheel to the mounting member.

8. An assembly as in claim 7, wherein the linkage means additionally comprise plate means joined to an end of the at least one metal rod, having a mounting port for securing the linkage means to the axle.

9. An assembly as in claim 7, wherein the linkage means has an end which is bent at an essentially right angle to meet the at least one mounting member.

* * * * *